Nov. 11, 1924.                                              1,514,997
M. R. STAVEN
APPARATUS FOR CONTRACTING AND EXPANDING DEMOUNTABLE RIMS
Filed Aug. 5, 1920          2 Sheets-Sheet 1
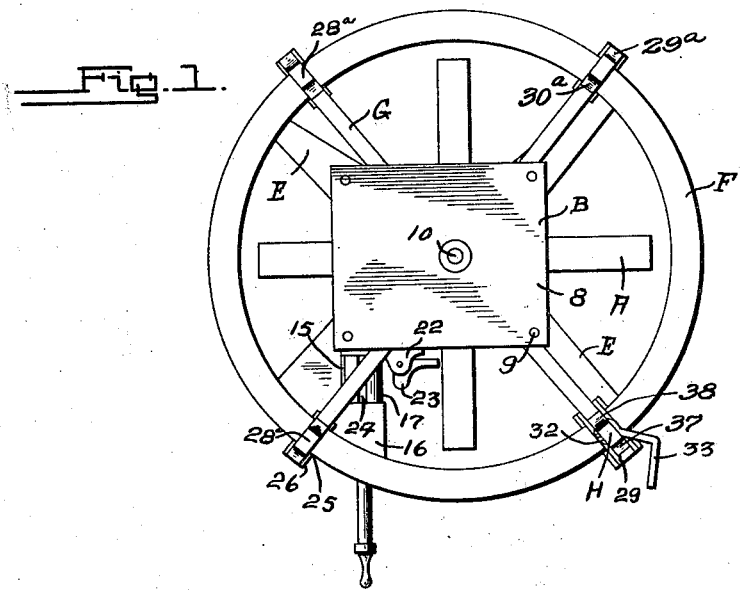
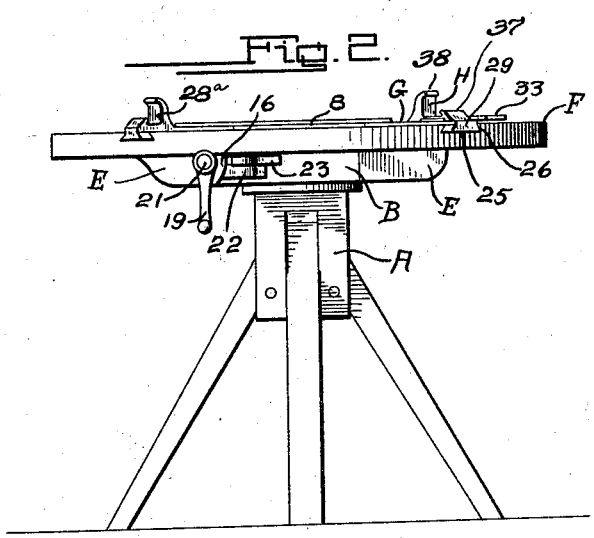
Inventor
Martin R. Staven
By Lancaster and Allwine
Attorneys

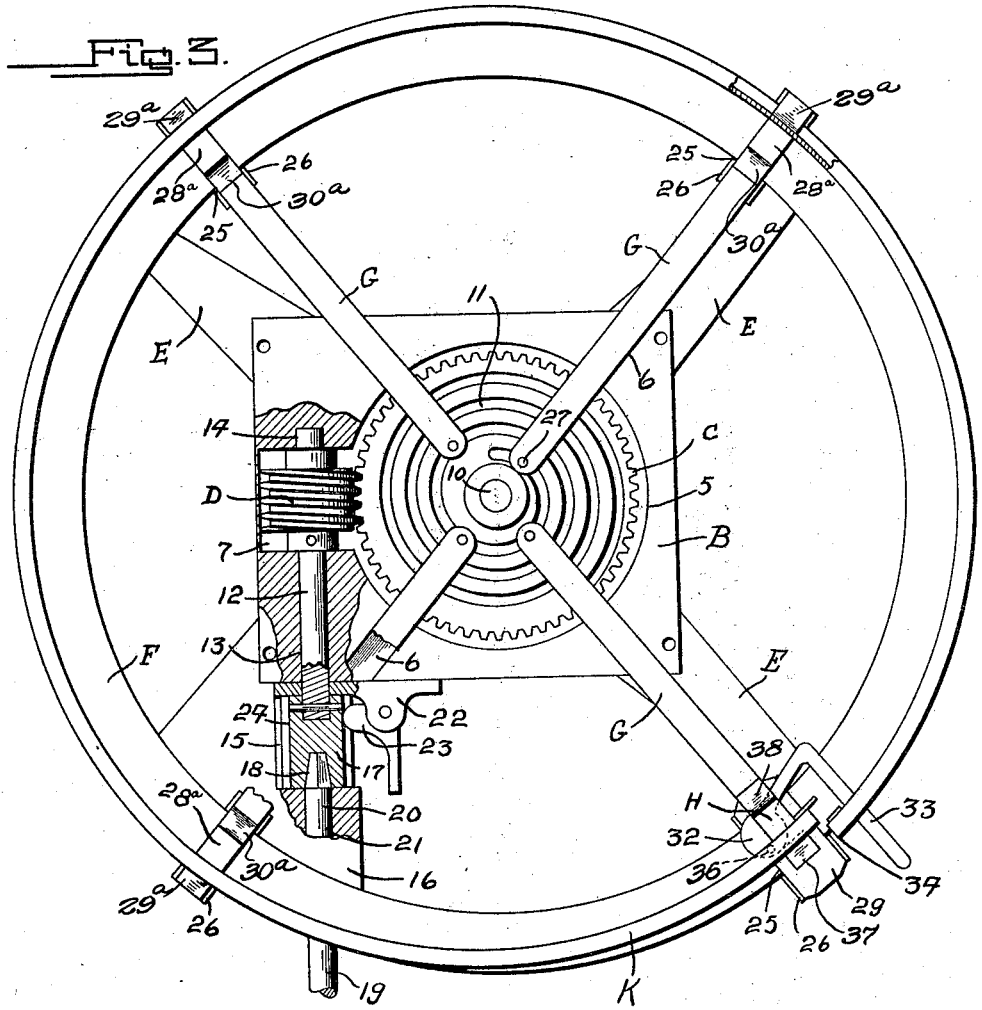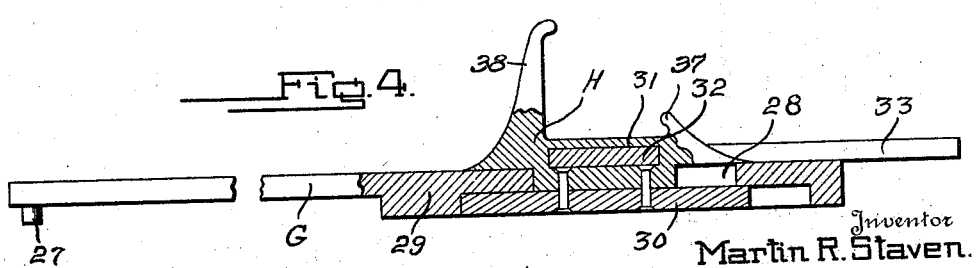

Patented Nov. 11, 1924.

1,514,997

UNITED STATES PATENT OFFICE.

MARTIN R. STAVEN, OF BROOKINGS, SOUTH DAKOTA.

APPARATUS FOR CONTRACTING AND EXPANDING DEMOUNTABLE RIMS.

Application filed August 5, 1920. Serial No. 401,472.

*To all whom it may concern:*

Be it known that I, MARTIN R. STAVEN, a citizen of the United States, residing at Brookings, in the county of Brookings and State of South Dakota, have invented certain new and useful Improvements in Apparatus for Contracting and Expanding Demountable Rims, of which the following is a specification.

The present invention relates to tire rim tools or apparatus such as are adapted to expand and contract tire rims.

The principal objects of the invention are to provide a tire rim tool which embodies means whereby the joint of a transversely split tire rim may be separated without necessitating the use of any separate tools; to so form such an apparatus which can be operated to exert a steady and positive force to expand or contract or to separate the joint of a tire rim all with very little effort on the part of the operator; to provide a tire rim tool which may be quickly adjusted for acting upon rims of different sizes; and to construct such a tire rim tool which is simple in construction, compact so that it may be conveniently carried in an automobile as an accessory and capable of manufacture at a minimum cost.

Other objects and advantages of the invention will appear in the following detailed description, taken in connection with the accompanying drawings, forming a part of this specification, and in which drawings:

Figure 1 is a plan view of the apparatus embodying my invention.

Figure 2 is a side elevation of the same.

Figure 3 is a view partly in plan and partly in horizontal section of my apparatus with the top cover removed from the central housing and with a tire rim in position to be expanded or contracted, and, Figure 4 is a detail view partly in side elevation and partly in section of the rim joint disconnecting bracket and rim engaging arm.

In the drawings where similar characters refer to similar parts throughout the views, A designates a suitable support on which the apparatus may be mounted for use, B indicates a central housing in which is mounted a worm wheel C adapted to be rotated by a worm D. Radially projecting supporting arms E carry an outer supporting ring F in which move the outer ends of sliding rim engaging arms G diverging from the housing B and moved by the rotation of worm wheel C. One of the sliding arms G carries a tire rim joint disconnecting bracket H. A tire rim of the usual structure is designated by the letter K.

The support A illustrated in the drawings is merely a representative structure suitable for supporting the apparatus.

The body of the central housing B is preferably rectangular and relatively flat. A circular depression 5 of suitable depth is centrally located in the upper surface of the housing B and radially diverging and relatively shallow grooves 6 traverse the upper surface of the housing from the central depression to its edges. A preferably rectangular cut out portion or deeper depression 7 is at one side of, and communicates with, the central depression 5. A covering or top plate 8 is fitted over the depressions in the housing B and is held thereon by bolts 9.

The worm wheel C is mounted to rotate on a vertical shaft 10 in the central depression 5. In the upper face of the worm wheel C is a spiral groove 11.

The worm D is mounted in the cut out portion 7 on a shaft 12 extending through a bore 13 in the housing B and having its inner end carried in a shallow bearing 14. The position of shaft 12 is such that worm D will engage worm wheel C.

The radially projecting supporting arms E are fixed to the lower surface of housing B. One of these arms E has a cut out portion 15 and lateral offset 16 as shown. The outer end of worm shaft 12 projects into the cut out portion 15 and has a collar 17 fitted thereon. The collar 17 has a squared socket 18 in its outer end into which a removable crank 19 may be inserted for rotation by passing the shank 20 of the latter through a bore 21 in the lateral offset 16. A bracket 22 in which is pivotally mounted a cam lever 23 is fixed to the housing B adjacent collar 17. The lever 23 is adapted to be swung to engage circumferentially spaced longitudinal grooves 24 in the collar 17 to hold shaft 12 against rotation.

The outer supporting ring F is fixed to the outer ends of the supporting arms E. Circumferentially spaced transverse keyways 25, one wider than the others, are cut through the upper portion of the ring F.

The rim engaging arms G extend from housing B in the diverging grooves 6 and have keys 26 on the lower portion of their outer ends which fit in the proper keyways 25. Downwardly extending pins 27 at the inner ends of each of the arms G are fitted in the spiral groove 11 of worm wheel C and and the arms are thus moved in grooves 6 and keyways 25 in radial relation to housing B by rotation of worm wheel C. Brackets 28$^a$ to hold a tire rim during operation of the apparatus are formed on the upper portion of the outer ends of all but one of the rim carrying arms G, each including a relatively short upstanding arm 29$^a$ on the extreme outer end for rim contracting purposes, and a relatively longer upstanding arm 30$^a$ spaced from the arm 29$^a$ for rim expansion purposes.

The tire rim joint disconnecting bracket H is slidably mounted in a longitudinal slot 28 in the widened outer end 29 of the remaining sliding arm G. The special bracket H is provided for longitudinal sliding with respect to the arm G and is slidably retained within the slot 28 by means of a plate portion 30, which engages in the enlarged lower part of the slot 28. The slot 28, is of course, definitely positioned in its arm G so that when the bracket H is slidably disposed in the arm G in the middle of the slot 28, this bracket H will bear a definite relation, in so far as the other brackets 28$^a$ are concerned for rim receiving purposes. A cam member 32 may be eccentrically pivoted as at 36 upon the enlarged end 29 of the arm G and preferably disposed to one side of the slot 28; said cam 32 being so related to the bracket H as to work within a slot 31 transversely provided therethrough. An angled lever 33 preferably extends from the cam 32, to a position outwardly of the rim supporting ring F, for manual operation in a manner to be subsequently described. It is preferred that the special bracket H be provided with a rim contracting arm 37, upwardly extending therefrom, and having a rim expanding arm 38 also provided thereon and spaced from the arm 37.

In the operation of this apparatus to contract a tire rim the sliding arms G are moved to accommodate the diameter of the rim by rotation of the crank 19 in the proper direction and the bracket H is moved to a central position in the slot 28. The tire rim K is then placed in the brackets 28$^a$ and H intermediate the upstanding arms provided thereon with its joint 34 just off and at one side of bracket H. In this position, the rim K will be loosely disposed upon the bracket structure 28$^a$ and H. As a preliminary step, the adjusting mechanism is so regulated through rotation of the crank 19 that the arms G are moved radially inwardly of the rim supporting ring F. This will place the upwardly extending arms 29$^a$ of the brackets 28$^a$ in engagement with the outer surface of the rim K. Likewise, the outer upstanding arm 37 of the bracket H will be in contact with the outer surface of the rim K adjacent the joint 34. Then by swinging lever 33 to move the bracket H inward the joint 34 will be disconnected. By further rotation of crank 19 in the proper direction rim K can be contracted, and when it is as desired the cam lever 23 is swung to engage the grooves 24 in collar 17 to hold the shaft 12 against accidental rotation which may be caused by the inherent tendency of the contracted rim K to expand. A tire may then be removed therefrom or placed on the rim K, and by disengaging cam lever 23 from the collar 17 the crank 19 may be rotated in the opposite direction to allow rim K to assume its normal position. In expanding the rim K after a tire has been placed thereon, the operator may either rotate the crank 19 so that the upstanding arms 30$^a$ and 38, may of themselves engage the inner surface of the rim K for forcing the same to an increased diameter, so that the joint 34 is snapped into position; or the arms G may be so radially extended that the upstanding arm portions 30$^a$ and 38 of the brackets 28$^a$ and H respectively, are positioned to engage the inside surface of the rim K to be expanded, and at which point in the expanding operation, the operator may so move the lever 33, that the cam 32 rigid therewith will radially extend the bracket H for snapping the ends of the rim to provide a closed joint.

It will be seen that an apparatus is thus provided whereby a tire rim can be contracted and expanded and its joint disconnected through the exertion of a steady and positive force but with very little effort on the part of the operator. The apparatus is furthermore of few parts and needs little care, except for grease in the grooves 11 and proper lubrication at other bearing joints.

The apparatus can be carried as an accessory in a suitable position on an automobile and can of course be used as an extra rim and tire carrier thereon, or it can be used in any shop as a part of its equipment, all depending on the manner in which it is supported.

It is to be understood that the form of my invention shown and described is to be taken as a preferred example of the same, and that various changes in the shape, size, and arrangement of parts may be resorted to without departing from the spirit of the invention or the scope of the subjoined claim.

I claim:

A device of the class described comprising a housing, diverging arms extending from said housing adapted to support a tire rim, means within the housing to move said arms radially thereof to cause a corresponding movement in the tire rim, a tire rim supporting bracket slidably mounted in a longitudinal slot in one of said arms, said bracket having a transverse slot therein, a cam pivotally mounted on said arm and adapted to oscillate in said slot to move said bracket to disconnect the joint of a tire rim.

MARTIN R. STAVEN.